United States Patent

Pueschel et al.

[11] Patent Number: 5,727,854
[45] Date of Patent: Mar. 17, 1998

[54] PROCESS FOR INITIATING AUTOMATIC BRAKING BASED ON RATE OF CHANGE OF INPUT PRESSURE

[75] Inventors: Helmut Pueschel, Marbach; Helmut Wiss, Moeglingen; Manfred Gerdes, Korntal-Muenchingen, all of Germany

[73] Assignee: Robert Bosch GmbH, Stuttgart, Germany

[21] Appl. No.: 670,350

[22] Filed: Jun. 25, 1996

[30] Foreign Application Priority Data

Jul. 8, 1995 [DE] Germany ............... 195 24 939.9

[51] Int. Cl.$^6$ ..................................... B60T 8/32
[52] U.S. Cl. ........................... 303/155; 303/166
[58] Field of Search ........................ 303/125, 155, 303/166, 165, 113.4, 146, DIG. 1–DIG. 4, 198

[56] References Cited

U.S. PATENT DOCUMENTS

| 4,848,851 | 7/1989 | Kuraoka et al. ................ 303/155 |
| 5,397,174 | 3/1995 | Willmann et al. ............... 303/113.5 |
| 5,505,526 | 4/1996 | Michels ............................ 303/155 |
| 5,535,123 | 7/1996 | Rump et al. ..................... 303/155 |
| 5,584,542 | 12/1996 | Klarer et al. .................... 303/155 |

FOREIGN PATENT DOCUMENTS

| 19501760 | 7/1996 | Germany . |
| 2280718 | 2/1995 | United Kingdom . |
| 2283546 | 5/1995 | United Kingdom . |
| 2283794 | 5/1995 | United Kingdom . |
| 2288446 | 10/1995 | United Kingdom . |

*Primary Examiner*—Matthew C. Graham
*Attorney, Agent, or Firm*—Felfe & Lynch

[57] ABSTRACT

When a threshold value is exceeded by the rate of change in the input pressure, an automatic braking operation is initiated. The threshold value becomes lower as the potential for danger increases.

10 Claims, 2 Drawing Sheets

PROCESS FOR INITIATING AUTOMATIC BRAKING BASED ON RATE OF CHANGE OF INPUT PRESSURE

BACKGROUND OF THE INVENTION

The invention pertains to a process and to a device for controlling the brake system of a vehicle wherein an automatic braking operation is initiated when the rate of change of input pressure to the master cylinder exceeds a threshold value.

A process of this type and a device of this type are known from nonprepublished German Patent Application No. 1 95 01 760. In that document, a control unit for a brake system is presented, in which, under certain operating conditions and in response to the driver's command, braking force beyond that actually requested by the driver is applied to the wheel brakes. An operating situation such as this can be, for example, the braking reaction of a driver in a dangerous situation. The known procedure has the effect of decreasing the braking distance. The known control system detects this panic braking situation by evaluating the input pressure in the master brake cylinder specified by the driver. If the rate of change in this pressure exceeds a predefined threshold, extra pressure is built up. The pressure buildup occurs in this case under the action of a pump, which increases the pressure in the brake system, which is preferably hydraulic. The system stops building up the extra pressure as soon as the input pressure falls below a predefined threshold. At that point, the brake pressure in the wheel cylinders is allowed to decrease to the value specified by the driver. It can be extremely difficult in some practical cases, however, to determine the threshold value for the rate of pressure change, i.e., the value at which the panic braking operation is initiated, because the detection of panic braking must be reliable in all driving situations.

SUMMARY OF THE INVENTION

It is the object of the invention to ensure the reliable detection of panic braking on the basis of the rate of change in the input pressure of a brake system in all driving situations.

This is achieved by modifying the threshold value as a function of at least one operating variable which indicates a dangerous situation, so that automatic braking is initiated with greater sensitivity as the potential danger of the situation increases.

By means of the process according to the invention, a panic braking reaction of the driver is detected reliably no matter what the driving situation may be. A misinterpretation of the driver's command (faulty detection or failure to detect a panic braking situation) is effectively avoided. This detection is preferably achieved without any additional sensors or other extra items of equipment.

The detection of panic braking on the basis of the higher input pressures can be made more sensitive by additional consideration of the vehicle velocity, the transverse and longitudinal accelerations, the engine power, more rapid movements of the steering wheel, or increasing interventions by a vehicle motion controller.

The signal expressing the change of rate is preferably filtered in various ways depending on the situation and the interference signals which may be present. This ensures that panic braking situations will always be detected reliably.

DESCRIPTION OF THE EXEMPLARY EMBODIMENTS

Figure 1:
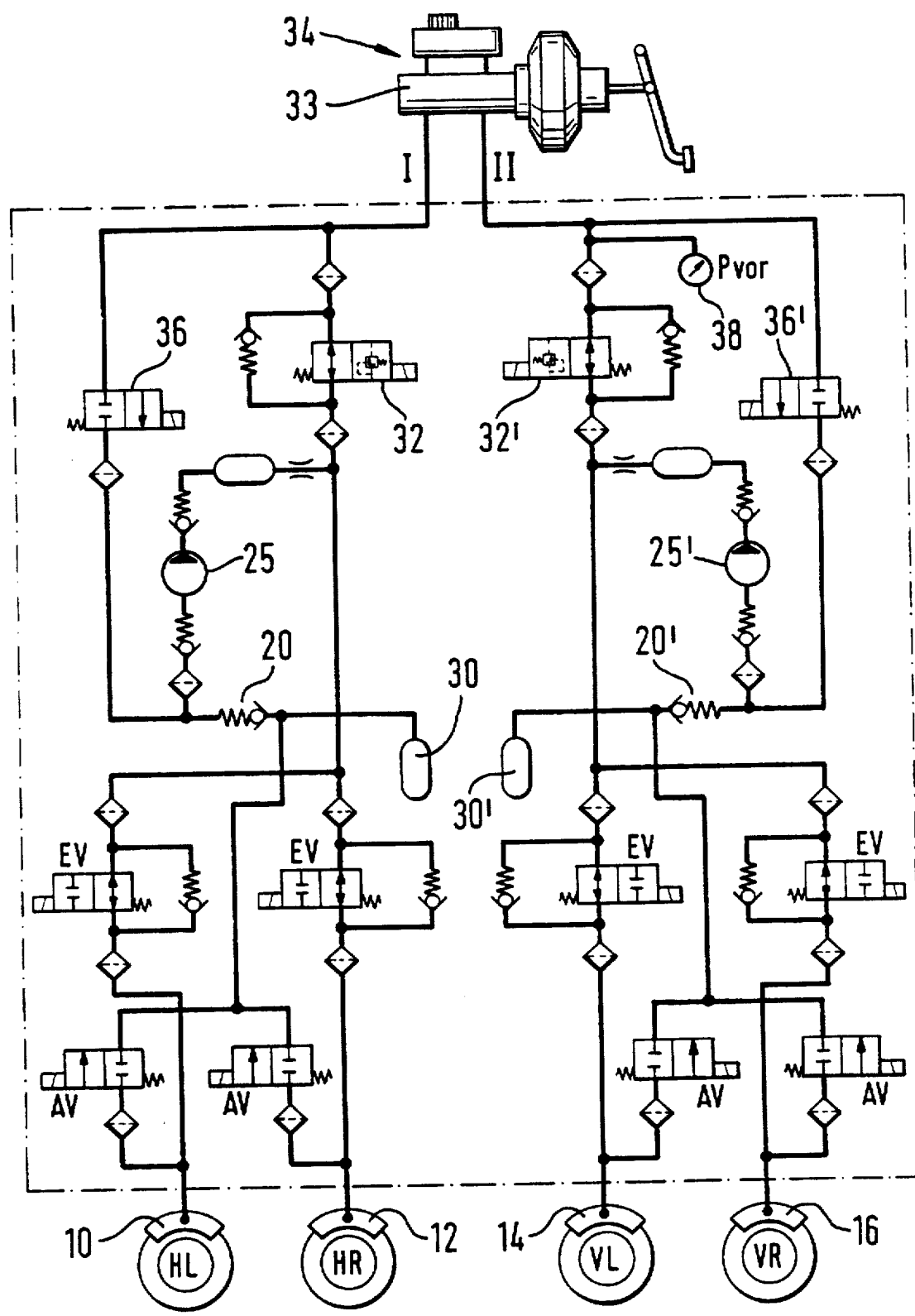
FIG. 1 is a schematic of the hydraulic circuit of the brake system.

FIG. 1 shows the brake system of a vehicle. Brake cylinder (or caliper) 10 is assigned to the left rear wheel, brake cylinder 12 to the right rear wheel, brake cylinder 14 to the left front wheel, and brake cylinder 16 to the right front wheel. The brake system for the rear wheels forms a first brake circuit I, that of the front wheels a second brake circuit II. Each of the wheel cylinders is connected to its own outlet valve (AV) and to an inlet valve (EV). The valves are actuated electrically by a control unit (not shown). In their working position (driven state), the outlet valves connect the wheel brake cylinders in each brake circuit by way of nonreturn valves 20, 20' to separate return pumps 25, 25'. In their unactuated rest state, the outlet valves block this connection.

Between the outlet valves and the return pump of each brake circuit, there is a low-pressure reservoir 30, 30'. In their unactuated state, the inlet valves allow the hydraulic medium to flow unhindered from master brake cylinder 33 via a switching valve 32, 32' in each brake circuit to the wheel brake cylinders. When actuated, the inlet valves block this passage. In addition, control valves 36, 36' are installed between the inlet to return pumps 25, 25' and brake device 34; these control valves, in conjunction with switching valves 32, 32', ensure the buildup of braking pressure in situations involving the regulation of drive slip. In addition, at least one pressure sensor 38 is installed in the area of the brake device to detect the input pressure Pvor specified by the driver.

Under normal operating conditions, all of the magnetic valves are in their rest positions. On actuation of the brake pedal, pressure is supplied via the switching valves 32, 32' and inlet valves EV to the respective wheel brake cylinders. If the tendency of one of the wheels to lock is detected, the corresponding inlet valve is blocked; the corresponding outlet valve AV may be actuated if necessary. In this operating state, the return pump 25, 25' draws brake fluid out of the wheel brake cylinders. If it is detected that one of the wheels is spinning too much, the associated switching and control valves are moved into their working positions, and the return pump is activated to build up pressure in the wheel brake cylinders to slow down the wheel in question. To reduce the pressure, the inlet valve is closed and the outlet valve opened. An electronic control unit, which is not shown in FIG. 1, is provided to evaluate the velocities of the wheels and to actuate the valves.

In a dangerous situation, the driver would like to bring the vehicle to a halt in the shortest possible distance. Therefore, he actuates the brake pedal very quickly and with great force. As a result, the input pressure in the brake lines of the brake circuits quickly becomes very high. Depending on the design of the brake system, this braking situation leads to the problem that, although the driver starts to brake very rapidly, he is unable to apply the braking pressure to the wheel brake cylinder which would be necessary to decelerate the vehicle in the most efficient possible manner. It is known according to the state of the art cited above that, in the braking situation described, active measures can be taken to help build up the pressure. For this purpose, a panic braking situation such as this is recognized on the basis of the rate of change in the input pressure. Once panic braking has been detected, the switching and control valves are actuated and the return pump turned on, with the result that a very high pressure is quickly built up in the wheel brake cylinders. This, however, can lead to the locking of the all wheels and to the response of the brake antilock system controller.

The essential difference between a normal braking situation, which ultimately can also lead to the response of the brake antilock system controller, and a panic braking in a dangerous situation is that, in the former case, the driver initiates the braking at a moderate rate, monitors the reaction of the vehicle, and then, according to the needs of the situation, gradually increases the brake pressure. In contrast, the driver engaging in panic braking stamps on the pedal with all his might. This means that the input pres- sure reaches very high rates of change even at the initiation stage (>30 bar per 20 ms). This has been found to be a typical signal of a panic reaction in dangerous situations and is used as a means of recognizing this unusual type of braking.

To be able to recognize panic braking, it is also necessary to determine the rate of change in the input pressure and to compare it with a threshold value, which marks the bound- ary between normal braking and the onset of panic braking. In the determination of the rate of change in the input pressure, suitable filter methods are required to avoid erro- neous measurements.

According to the invention, low-pass filtering is imple- mented; the filter constant of the low-pass filter depends on the situation and on the interference signals which may be present. The filter constant is specified as a function of the interference frequencies. In particular, the engine rpm's and the velocity of the vehicle cause a shift in the frequencies of these interference signals. The corresponding dependence of the filter constant on one or more operating variables is determined experimentally.

The process of determining the threshold must also take into consideration the situation prevailing at the time. At high input pressures, it is difficult to generate a high input pressure gradient by means of the brake pedal. Therefore, the threshold value is adjusted appropriately so as to make the detection of panic braking more sensitive at high input pressures; that is, the threshold value is lowered when the input pressures are high. The same is true in an analogous sense for high vehicle velocities, high vehicle yaw rates, high transverse and longitudinal accelerations, rapid move- ments of the steering wheel, and high engine power. All these operating variables are indicators of possible danger situations, to which the system reacts by increasing the sensitivity with which panic baking is detected. The same applies analogously in the presence of vehicle motion con- trollers in cases where this vehicle motion controller inter- venes actively to build up the pressure, which in and of itself already characterizes a danger situation which may or may not have been identified by the driver. Here, too, it is logical to increase the sensitivity with which panic braking is detected.

Figure 2:
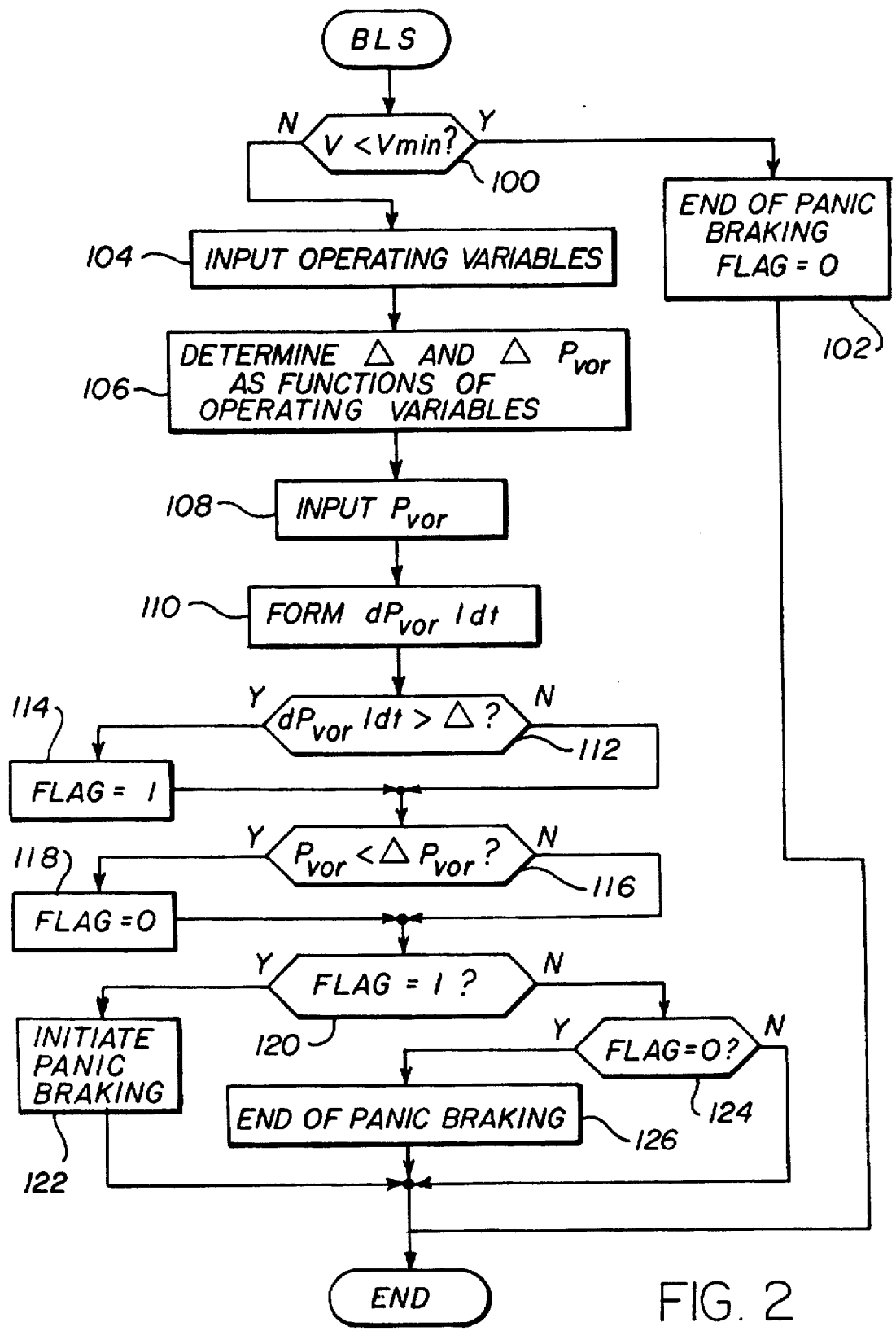
FIG. 2 is a flow chart illustrating the procedure according to the invention as a computer program.

FIG. 2 provides information on how this procedure according to the invention can be implemented as a program running on a microcomputer in the control unit. This pro- gram is described in the form of a flow chart.

The section of the program described in the figure starts to run on actuation of the brake pedal by the closing of the brake pedal switch (BLS). In the first step 100, the condi- tions which determine when an automatic braking process of the vehicle of the type described above may be carried out are checked. The essential point here is that, in step 100, the velocity of the vehicle is compared with a predefined minimum value, which is in the range of a few kilometers per hour. If the vehicle velocity falls below this minimum value, it is not possible for safety reasons for automatic braking to be initiated. In a similar sense, step 100 prohibits an automatic braking process when defects are present in any of the sensors or sensor signals. If such an operating state is detected in step 100, step 102 terminates a panic braking project which may be in progress, and a flag is set to a value of 0. Then this section of the program ends and is run again whenever necessary.

If the conditions according to step 100 are not fulfilled, it is possible for an automatic braking process to be initiated if necessary. In step 104, the operating variables to be processed in the further course of the program are accepted as input. These are, depending on the exemplary embodiment, the input pressure, the vehicle velocity, the vehicle yaw rate, the transverse acceleration, the longitudi- nal acceleration, the change in the angle of the steering wheel, the current engine power or torque, and/or the brake pressure demand of a vehicle motion controller. In a corre- sponding manner, the threshold value $\Delta$ for the rate of pressure change is determined as a function of at least one of the above-cited operating variables in step 106. The individual characteristics or the characteristic fields are to be determined experimentally for each type of vehicle and for each operating variable. In a preferred exemplary embodiment, a straight segment proceeding from a lower to an upper limit value has been found suitable for the course of the function. In general, threshold value $\Delta$ will be lower and thus the detection of panic braking made more sensitive as the input pressure, vehicle velocity, vehicle yaw rate, transverse acceleration, longitudinal acceleration, changes in the steering wheel angle, engine power or torque, and brake pressure demand by a vehicle motion controller increase. In addition, a threshold value $\Delta P_{vor}$ for the absolute value of the input pressure is accepted as input as a function of the operating variables.

In the following step 108, the measured input pressure Pvor in accepted as input, and in the next step 110, the rate of change in the pressure is determined. This is done by finding the difference between the current input pressure which has been read in and the input pressure value which was accepted as input during the previous run of the program, relative to the time interval between two sampling points. The signal for the rate of change in the input pressure is then sent through the low-pass filter. The filter constant is based here on the interference frequency range, which is determined by the known pressure pulsations, e.g., by the return pumps of the brake system or by signal interferences originating from, for example, valve actuation currents, etc. This means that, for example, in the case of a high input pressure, the filtering will be different from that which is done at smaller values. In step 112 the filtered rate of change in the pressure calculated in step 110 is compared with the threshold value $\Delta$ taken from step 106. If the rate of pressure change exceeds this threshold, then in step 114 a flag is set to the value of 1. This mark indicates whether the exceeding of the threshold value by the rate of change in the input pressure is being recognized for the first time. Next, accord- ing to step 116, the absolute value of the input pressure $\Delta P_{vor}$ is compared with a threshold value $\Delta P_{vor}$. If the input pressure is smaller than the threshold value, the flag is set to a value of zero in step 118; otherwise, it is kept unchanged. This step allows the initiation of a panic braking operation only when the absolute value of the input pressure exceeds a predetermined threshold or brings to an end a panic braking operation in progress. Thereupon, in step 120, the system checks to see whether the flag has a value of 1. If this is so, in step 122 panic braking is initiated, and the pressure in the wheel brakes is built up quickly. If the flag does not have a value of 1, the program checks in step 124 to see whether it has a value of zero. If this is so, panic braking is ended in step 126; the additional pressure build up in the brake system is released and the brake pressure in the wheel brake cylinders is adjusted in correspondence with the driver's command.

What is claimed is:

1. Process for controlling the brake system of a vehicle,
   measuring the input pressure of the brake system provided by a driver,
   determining the rate of change of said input pressure,
   determining at least one operating variable selected from the group consisting of vehicle velocity, vehicle yaw rate, transverse acceleration, longitudinal acceleration, steering angle, engine torque, and braking pressure demanded by a vehicle motion controller,
   determining a threshold value as a function of at least one of the group consisting of said operating variables and said input pressure,
   varying said threshold value in dependence upon at least one of said input pressure and said at least one operating variable,
   comparing said rate of change of input pressure to said threshold value, and
   initiating automatic braking when said rate of change of input pressure exceeds said threshold value.

2. Process according to claim 1 wherein said at least one operating variable is the velocity of the vehicle.

3. Process according to claim 1 wherein said at least one operating variable is the vehicle yaw rate.

4. Process according to claim 1 wherein said at least one operating variable is the transverse acceleration of the vehicle.

5. Process according to claim 1 wherein said at least one operating variable is the longitudinal acceleration.

6. Process according to claim 1 wherein said at least one operating variable is the steering angle.

7. Process according to claim 1 wherein said at least one operating variable is the engine torque being generated.

8. Process according to claim 1 wherein said at least one operating variable is the braking pressure demanded by a vehicle motion controller.

9. Process according to claim 1 wherein, in the determination of the rate of change in the input pressure, low-pass filtering is carried out as a function of a known interference frequency.

10. Process as in claim 1 wherein said threshold value is decreased in dependence upon an increase in at least one of said input pressure and said at least one operating variable.

* * * * *